(12) United States Patent
Verschuren et al.

(10) Patent No.: US 9,995,831 B2
(45) Date of Patent: Jun. 12, 2018

(54) X-RAY DETECTOR WITH IMPROVED SPATIAL GAIN UNIFORMITY AND RESOLUTION AND METHOD OF FABRICATING SUCH X-RAY DETECTOR

(75) Inventors: Coen Adrianus Verschuren, Eindhoven (NL); Heidrun Steinhauser, Eindhoven (NL); Tiemen Poorter, Heerlen (NL); Hugo Johan Cornelissen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 777 days.

(21) Appl. No.: 13/642,861

(22) PCT Filed: Apr. 19, 2011

(86) PCT No.: PCT/IB2011/051681
§ 371 (c)(1),
(2), (4) Date: Oct. 23, 2012

(87) PCT Pub. No.: WO2011/135486
PCT Pub. Date: Nov. 3, 2011

(65) Prior Publication Data
US 2013/0037723 A1    Feb. 14, 2013

(30) Foreign Application Priority Data
Apr. 26, 2010   (EP) .................................. 10160988

(51) Int. Cl.
*G01T 1/20*   (2006.01)
(52) U.S. Cl.
CPC .................. *G01T 1/2002* (2013.01)

(58) Field of Classification Search
CPC ........... G01T 1/00; G01T 1/20; G01T 1/2002; G01T 1/2006; G01T 1/2012; G01T 1/2018
(Continued)

(56) References Cited

U.S. PATENT DOCUMENTS 5,587,621 A * 12/1996 Colditz ................. H01J 29/385
                                                                313/366
6,592,969 B1 * 7/2003 Burroughes et al. ...... 428/195.1
(Continued)

FOREIGN PATENT DOCUMENTS

JP   62235588 A  * 10/1987
JP   2007127734 A    5/2007
(Continued)

OTHER PUBLICATIONS

Zhu et al., Toward Novel Flexible Display—Top-Emitting OLEDs on Al-Laminated PET substrates, Aug. 2005, Proceedings of the IEEE, vol. 93, No. 8, pp. 1440-1446.*
(Continued)

*Primary Examiner* — David Porta
*Assistant Examiner* — Blake Riddick
(74) *Attorney, Agent, or Firm* — Larry Liberchuk

(57) ABSTRACT

An X-ray detector (1) includes a light detection arrangement (3) such as a CMOS photodetector, a scintillator layer (5) such as a CsI:Tl layer, a reflector layer (9) and a light emission layer (7) interposed between the scintillator layer (5) and the reflector layer (9). The light emission layer (7) may include an OLED and may have a thickness of less than 50 μm. Thereby, a sensitivity and resolution of the X-ray detector may be improved.

27 Claims, 2 Drawing Sheets

(58) Field of Classification Search
USPC ............... 250/336.1, 361 R, 363.01, 370.08, 250/370.09, 370.11

See application file for complete search history.

(56) References Cited

U.S. PATENT DOCUMENTS

| | | | |
|---|---|---|---|
| 6,812,469 B2* | 11/2004 | Katagiri | 250/368 |
| 2003/0127973 A1* | 7/2003 | Weaver et al. | 313/504 |
| 2004/0252867 A1* | 12/2004 | Lan | G06K 9/0004 382/124 |
| 2005/0023472 A1* | 2/2005 | Wei et al. | 250/368 |
| 2006/0033031 A1* | 2/2006 | Takeda et al. | 250/370.11 |
| 2006/0105492 A1 | 5/2006 | Veres | |
| 2006/0201181 A1* | 9/2006 | Bauer et al. | 62/264 |
| 2006/0220509 A1* | 10/2006 | Ghosh et al. | 313/110 |
| 2007/0097042 A1* | 5/2007 | Bauer et al. | 345/82 |
| 2007/0131867 A1* | 6/2007 | Okada et al. | 250/370.09 |
| 2007/0152213 A1* | 7/2007 | Weaver | 257/40 |
| 2007/0176131 A1 | 8/2007 | Takahashi | |
| 2007/0298169 A1* | 12/2007 | Kim et al. | 427/282 |
| 2008/0116815 A1* | 5/2008 | Foust et al. | 315/185 R |
| 2008/0290280 A1* | 11/2008 | Ruetten et al. | 250/361 R |
| 2009/0221207 A1* | 9/2009 | Russell et al. | 445/25 |
| 2009/0283685 A1 | 11/2009 | Takeda et al. | |
| 2010/0327169 A1* | 12/2010 | Korn | 250/363.01 |
| 2011/0017913 A1 | 1/2011 | Kasai et al. | |
| 2011/0037382 A1* | 2/2011 | Choi et al. | 313/504 |
| 2011/0124136 A1 | 5/2011 | Hirayama et al. | |
| 2012/0098421 A1* | 4/2012 | Thompson | 313/512 |
| 2012/0146489 A1* | 6/2012 | Fischer et al. | 313/504 |
| 2012/0286651 A1* | 11/2012 | Levermore et al. | 313/504 |

FOREIGN PATENT DOCUMENTS

| | | | |
|---|---|---|---|
| JP | 2007225598 A | | 9/2007 |
| JP | 2009140817 A | | 6/2009 |
| WO | WO200065879 A1 | * | 2/2000 |
| WO | WO200065879 | | 11/2000 |
| WO | WO2007086485 | | 8/2007 |
| WO | WO 2007086485 A1 | * | 8/2007 |
| WO | 2008126012 A2 | | 10/2008 |
| WO | 2008129473 A2 | | 10/2008 |
| WO | WO2008126009 | | 10/2008 |
| WO | WO 2008126009 A2 | * | 10/2008 |
| WO | WO 2009007899 A1 | * | 1/2009 |
| WO | 2009025286 A1 | | 2/2009 |
| WO | 2010004703 A1 | | 1/2010 |
| WO | 20100023970 A1 | | 3/2010 |

OTHER PUBLICATIONS

F. Zhu et al., "Toward Novel Flexible Display—Top-Emitting OLEDs on Al_Laminated PET Substrates", Proceedings of the IEEE, vol. 93, No. 8, Aug. 2005, pp. 1440-1446.

Electro Luminescence Incorporated, Technical Specifications, electroluminescence-inc.com/techspec.htm, Cited to the EPO by Philips in an Aug. 1, 2012 Letter, 2 Page Document.

Zheng et al, "The Developments and Challenges in OLED, Flexible and See-Through Display Technologies, and Organic Luminescent Materials", Advanced Display, No. 101, Jun. 2009, p. 5-10.

\* cited by examiner

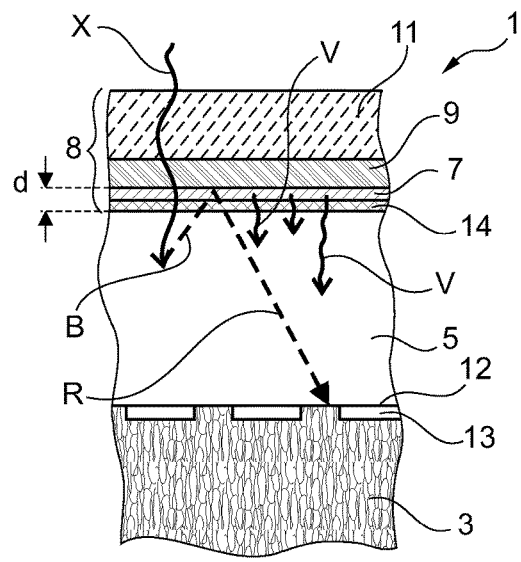
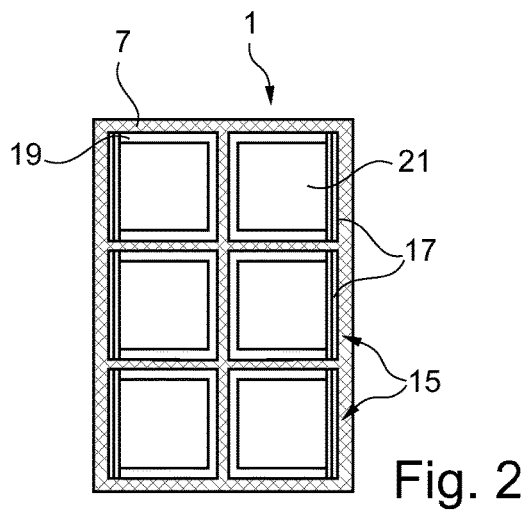
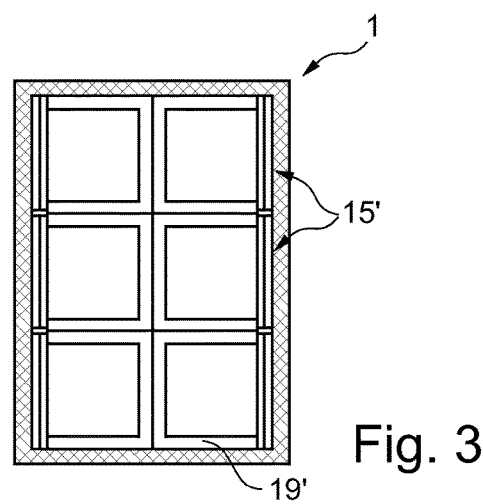
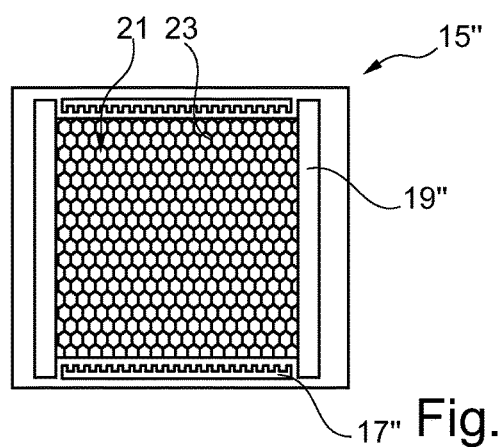

X-RAY DETECTOR WITH IMPROVED SPATIAL GAIN UNIFORMITY AND RESOLUTION AND METHOD OF FABRICATING SUCH X-RAY DETECTOR

FIELD OF THE INVENTION

The present invention relates to an X-ray detector having an improved spatial gain uniformity and resolution. Furthermore, the present invention relates to a method of producing such X-ray detector.

BACKGROUND OF THE INVENTION

An X-ray detector typically comprises a scintillator layer which converts incident X-rays into light and a light detection arrangement such as e.g. a CMOS photodetector for detecting the light generated within the scintillator layer and incident on a detection surface of the light detection arrangement.

It has been observed that such X-ray detectors may suffer from phantom images. Therefore, WO 2008/126009 proposes to use a secondary radiation source for irradiating the scintillator layer with a secondary radiation which has a wavelength different from a wavelength of incident X-rays. By irradiating such secondary radiation, the proposed X-ray detector may be capable of producing a spatially more uniform response of the scintillator to incident X-rays. The secondary radiation may be provided using e.g. a luminescence sheet or an LED edge-lit waveguiding plate. In a "back-lit" arrangement, the secondary radiation source may be placed behind the light detection arrangement. In this case, the light detection arrangement should have a transparent carrier substrate. Alternatively, in a "front-lit" arrangement, the secondary radiation source may be placed on top of the scintillator layer. In this case, the secondary radiation source should be substantially transparent for X-rays and robust against this radiation.

SUMMARY OF THE INVENTION

It may be advantageous to provide an X-ray detector having an improved spatial gain uniformity and resolution. Particularly, it may be advantageous to provide an X-ray detector having a high and uniform resolution and preventing phantom images. Furthermore, it may be advantageous to provide an X-ray detector which may be easy and cheap to produce. Furthermore, it may be advantageous to provide a method of producing such X-ray detector.

According to a first aspect of the present invention, an X-ray detector is described comprising a light detection arrangement, a scintillator layer, a reflector layer and a light emission layer. Therein, the light detection arrangement is adapted for detecting light incident on a detection surface thereof and may be implemented for example with a CMOS or a CCD. The scintillator layer is adapted for converting incident X-rays into light. The scintillator layer may be arranged on top of the detection surface of the light detection arrangement. The reflector layer is adapted for reflecting light generated within the scintillator layer in a direction towards the light detection arrangement. For example, the reflector layer may be a mirror layer using e.g. a metal coating. The light emission layer is interposed between the scintillator layer and the reflector layer.

An X-ray detector comprising a combination of a light emission layer and a reflector layer on top of a scintillator layer may exhibit an enhanced responsivity while at the same time enabling preventing of phantom images. Light generated within the scintillator layer upon incidence of X-rays may be reflected by the reflector layer towards the detection surface of the light detection arrangement. Thereby, the responsivity of the detector may be increased. Furthermore, light emitted by the light emission layer may reach the scintillator layer arranged adjacent thereto. For example, such secondary light may be emitted during periods in which the scintillator layer is not irradiated by X-rays. With such secondary light irradiation, formation of phantom images may be reduced. The layer stack comprising the scintillator layer, the reflector layer and the intermediate light emission layer may be easily and cost-effectively fabricated using well-established methods such as layer deposition or layer growth.

According to an embodiment, the distance between the scintillator layer and the reflector layer is less than 50 μm, preferably less than 20 μm. In other words, in case the light emission layer directly abuts both the scintillator layer at one surface and the reflector layer at the opposite surface, the thickness of the light emission layer should be less than 50 μm or preferably less than 20 μm.

It has been found that a large distance between the top surface of the scintillator layer and the bottom surface of the reflector layer may result in degradation of the modulation transfer function (MTF) performance or the resolution performance of the detector. Accordingly, such distance should be as small as possible and an upper limit of 50 μm or preferably of 20 μm for such distance has been observed to result in acceptable MTF or resolution performance for practical applications.

According to an embodiment of the invention, the light emission layer comprises an OLED (organic light emitting diode).

OLEDs can be easily produced at low costs. Furthermore, conventional OLED structures may be modified in order to reduce the thickness of the OLED to less than 50 μm to thereby satisfy the requirement explained with respect to the previous embodiment.

The OLED may be provided as a top-emission OLED foil or a bottom-emission OLED foil comprising a layer stack including a luminescent layer, electrode layers, protection layers and, optionally, support layers. As explained in further detail below, provisions may be made with respect to the arrangement and the production of the layer stack in order to keep the thickness of the layer stack below 50 μm.

According to an embodiment of the invention, the light emission layer is divided into sub-tiles. In other words, instead of interposing one large-area light emission layer between the scintillator layer and the reflection layer wherein such large-area light emission layer substantially has the same surface area as the scintillator layer, the light emission layer may be divided into sub-tiles each of the sub-tiles having an area being only a fraction of the area of the scintillator layer. The combination of the plurality of sub-tiles may then cover the entire area of the scintillator layer.

The reduced area of a single sub-tile compared to the entire area of the scintillator layer may allow for a quick response of the light emission layer upon activation as the capacitance C of such OLED sub-tile and therefore the RC time is kept small. Accordingly, such sub-tiled OLED light emission layer may be suitable for pulsed operation, e.g. when the light emission layer is only activated during time intervals when no X-rays are incident onto the X-ray detector. The various sub-tiles can be connected in series to benefit from lower operation currents and hence reduce resistance losses. Alternatively, the sub-tiles may be addressed individually.

According to a further embodiment, the light emission layer comprises metal shunt lines. The shunt lines may reduce resistance losses and improve emission uniformity from an OLED light emission layer. Such shunt lines may be provided as a grid of metal lines having e.g. rectangular or hexagonal geometry. The metal lines may have a thickness below 1 µm and may therefore have no measurable negative effect on the X-ray detection performance.

According to a second aspect of the present invention, a method of fabricating an X-ray detector is proposed. The method comprises providing a light detection arrangement, providing a scintillator layer, providing a reflector layer and providing a light emission layer interposed between the scintillator layer and the reflector layer. Therein, the components of the X-ray detector may have the characteristics as described above with respect to the first aspect of the invention. The light detection arrangement may be provided as a semiconductor light detector with two-dimensional resolution such as a CMOS or a CCD photodetector and may be produced using conventional semiconductor technology. The layer stack including the scintillator layer, the reflector layer and the intermediate light emission layer may be produced using various layer generation methods such as layer deposition or layer growth including techniques such as CVD, PVD, epitaxy, etc. Therein, as will be described in further detail below, the arrangement of the layers, the preparation of the layers and the attachment of layers to each other or to the light detection arrangement may be specifically adapted in order to achieve advantageous properties of the X-ray detector. Specifically, the distance between the scintillator layer and the reflector layer may be kept small by specifically adapting the interposed light emission layer and its attachment to the adjacent scintillator and reflector layers.

While the light emission layer, the reflector layer and the scintillator layer may be first produced separately and subsequently attached to each other, it may be advantageous to integrate combinations of such layers. For example, the light emission layer may comprise a reflector layer integrated therein.

According to an embodiment, the light emission layer is provided with an OLED wherein layers forming the OLED are directly deposited onto a surface of the scintillator layer. Such technique may beneficially use the fact that a complete OLED processing may be done at temperatures below typical process temperatures of the scintillator. Accordingly, the OLED stack may be deposited directly on top of the scintillator and advantages such as process simplicity, reduction of manufacturing and handling steps and reduced thickness of the OLED light emission layer may be obtained.

According to an alternative embodiment of the invention, the scintillator layer is grown directly onto a surface of the light emission layer. Again, a layer stack including both, the light emission layer and the scintillator layer and, preferably, the reflector layer may be easily produced with advantageous handling and thickness characteristics.

It has to be noted that embodiments of the invention are described herein with reference to different subject-matters. In particular, some embodiments are described with reference to apparatus type claims whereas other embodiments are described with reference to method type claims. However, a person skilled in the art will gather from the above and the following description that, unless other notified, in addition to any combination of features belonging to one type of subject-matter also any combination between features relating to different subject-matters, in particular between features of the X-ray detector and features of the method of producing the X-ray, is considered to be disclosed with this application.

The aspects and embodiments defined above and further aspects of the present invention may be apparent from exemplary embodiments to be described hereinafter but to which the invention is not limited.

BRIEF DESCRIPTION OF THE DRAWINGS

FIG. 1 shows a cross-section of an X-ray detector according to an embodiment of the present invention.

FIG. 2 shows a front view onto an array of sub-tiles of an X-ray detector according to an embodiment of the present invention.

FIG. 3 shows a front view onto an array of sub-tiles of an X-ray detector according to an alternative embodiment of the present invention.

FIG. 4 shows details of a sub-tile of an X-ray detector according to an embodiment of the present invention.

Figure 5:
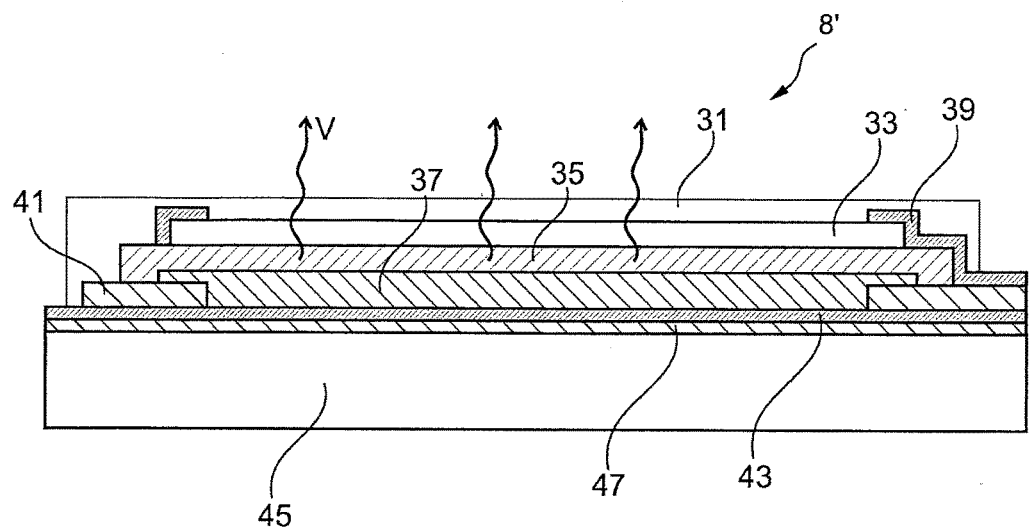
FIG. 5 shows a cross-section of an exemplary top-emission OLED foil for an X-ray detector according to an embodiment of the present invention.

All figures are schematically only and not to scale. Similar features are referenced with similar reference signs throughout the figures.

DETAILED DESCRIPTION OF EMBODIMENTS

FIG. 1 shows a cross-section of an embodiment of an X-ray detector 1. The X-ray detector 1 comprises a light detection arrangement 3, a scintillator layer 5, a reflector layer 9 and a light emission layer 7.

The light detection arrangement 3 is a silicon-wafer-based CMOS photodetector comprising an array of photosensitive elements 13 at a detection surface 12 thereof. The photosensitive elements 13 are adapted to detect incidence of light thereon and to generate an electrical signal upon such detection. Herein, "light" may refer to electromagnetical radiation having a substantially longer wavelength than X-radiation. Particularly, "light" may include the visual wavelength range as well as parts of the ultraviolet and/or infrared wavelength range. For example, photosensitivity in a range from 350-1050 nm may be provided.

On top of the detection surface 12 and abutting thereto, a scintillator layer 5 is provided. The scintillator layer may comprise a doped crystal such as caesium iodide doped with thallium (CsI:Tl). For example, the scintillator layer 5 may have a thickness of 200 to 700 µm.

On top of the scintillator layer 5 at a surface opposite to the detection surface 12, an OLED (organic light emitting diode) foil 8 is provided. The OLED foil 8 comprises the light emission layer 7 which is adapted to emit light e.g. in the wavelength range of 300-500 nm upon application of an electric voltage thereto. Between the light emission layer 7 and the scintillator layer 5, the OLED foil 8 comprises a thin encapsulation layer 14. The encapsulation layer 14 may have a thickness of 1 to 5 µm. On an opposite surface of the light emission layer 7, a thin metal layer serving as a reflector layer 9 is provided. This metal layer may be a smooth layer of aluminium serving as a mirror to light. The metal layer may be very thin, for example less than 10 µm, preferably less than 1 µm, preferably in a range from 50-500 nm, such that incident X-rays (indicating in FIG. 1 by the arrow X) may be substantially transmitted through the metal layer. At an outer surface of the OLED foil 8 a support substrate layer 11 is provided. The support substrate layer 11 may have a thickness of e.g. 0.05-3 mm and may mechanically stabilize the OLED foil during handling thereof. The support substrate layer 11 should be substantially transmissive to X-rays and may be made from e.g. glass or plastics.

As indicated in FIG. 1 by the arrow X, X-rays may be irradiated onto the X-ray detector 1 and may be transmitted through the OLED foil 8 due to the fact that the OLED foil 8 comprises layers such as light emission layer 7, support substrate layer 11 or encapsulation layer 14 made from materials substantially non-absorptive to X-rays and layers made from X-ray absorptive materials but having a very small thickness such as the metal reflector layer 9. Within the scintillator layer 5, the X-ray is absorbed and converted to light. Part of this light may be emitted in a direction away from the detection surface 12 and towards the OLED foil 8 as indicated by the arrow B. This light may be reflected at the mirroring reflector layer 9 as indicated by the arrow R and may therefore reach the detection surface 12. Accordingly, the sensitivity of the X-ray detector 1 may be increased.

The OLED foil 8 should be prepared and arranged such that the light emission layer 7 and any other layers such as encapsulation layer 14 interposed between the reflector layer 9 and the scintillator layer 5 may be provided with a very small thickness of the layer stack of e.g. less than 50 µm, preferably less than 20 µm. Thereby, the distance d between a lower surface of the reflector layer 9 and an upper surface of the scintillator layer 5 may be kept small, i.e. below 50 µm. Due to this small distance, the interposed light emission layer 7 does not have a significant negative influence onto an MTF performance or a resolution of the detector.

While X-ray illumination may be effectively detected with the X-ray detector by converting the X-rays into light within the scintillator layer 5 and then detecting the light with the light detection arrangement 3, a problem of so-called phantom images has been observed in similar conventional scintillator-based X-ray detectors upon irradiation with subsequent X-ray illumination pulses. In other words, remainders of a previous X-ray illumination pulse image may be visible in a subsequent X-ray illumination pulse image. This effect is also explained in WO 2008/126009 A2. In order to prevent such phantom images, the scintillator layer 5 may be irradiated with light emitted by the light emission layer 7 during periods between subsequent X-ray illumination pulses. As indicated by the arrows V, the light emission layer 7 may emit light in a wavelength range of 300-500 nm as light emission pulses in between X-ray illumination pulses. The light emission pulses may "reset" the scintillator layer 5 thereby preventing phantom images.

In order to allow such pulsed operation of the light emission layer 5, the light emission layer should have a short response time. In case of large detector areas of e.g. 20×30 cm$^2$, a light emission layer 7 having such large area might have a large capacitance C. Such large capacitance C may result in an increased RC time of the light emission layer 7 for uniform irradiation of the detector area.

Therefore, as shown in FIGS. 2 and 3, it may be advantageous to divide the light emission layer 7 into sub-tiles 15. Each of the sub-tiles 15 may have a small area of e.g. 4×4 cm$^2$ and may therefore have a reduced capacitance leading to a faster RC time. Each sub-tile 15 may have a positive electrode 19 and a negative electrode 17 enclosing a light emitting area 21. The various sub-tiles 15 can be connected in series to benefit from lower operation currents and hence reduce resistance losses. Alternatively, the sub-tiles 15 can be addressed individually.

As shown in FIG. 3, the sub-tiles 15' may be arranged such that a common positive electrode 19' may be provided for all sub-tiles 15'.

FIG. 4 shows details of a sub-tile 15". To further reduce resistance losses and to improve emission uniformity of the light emission area 21" of the sub-tile 15", additional metal shunt lines 23 may be used. These shunt lines 23 may have a thickness of e.g. below 1 µm and may be made e.g. from aluminium. The shunt lines 23 may form a rectangular or hexagonal grid. Due to their small thickness, the shunt lines do not have a measurable negative effect on the X-ray detection performance, especially after local offset and gain calibration.

Figure 6:
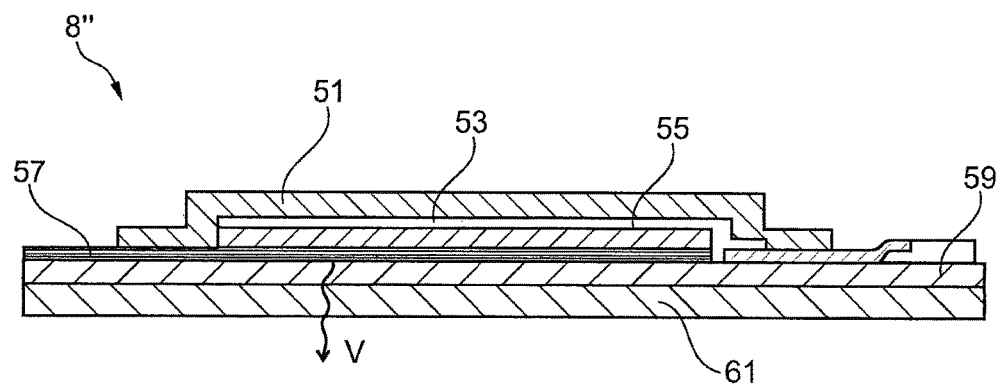
FIG. 6 shows a cross-section of an exemplary bottom-emission OLED foil for an X-ray detector according to an embodiment of the present invention.

FIGS. 5 and 6 show OLED foils 8', 8" as may be used for X-ray detectors according to embodiments of present invention. The dedicated OLED foils may be fabricated with an exceptionally thin transparent protective layer on a light emitting side of the OLED light emission layer. This protective layer should have excellent moisture barrier properties and should be less than 50 µm thick, preferably less than 20 µm or even thinner. A next step in assembly may be to laminate or glue the foil 8 on top of the scintillator layer 5, either before or after attaching this scintillator layer 5 to the light detection arrangement 3 such as a CMOS detection array for example by gluing. Different types of OLED foils may be distinguished.

FIG. 5 shows a top-emission OLED foil 8'. As the name indicates, light is emitted from the top of the foil 8' through a transparent cathode, as indicated by the arrow V. The top light-emitting surface of the OLED foil 8' may be mounted on the top surface of the scintillator layer 5, i.e. upside down, by lamination or gluing.

The layer stack of the OLED foil 8' will be explained from the bottom to the top, i.e. in a possible order of deposition of the layers:

In conventional OLED stacks, a metal foil is commonly used for fulfilling two purposes, i.e. serving as a substrate for mechanically stabilizing the foil and serving as an electrode for electrically connecting adjacent layers. However, such metal foil typically has a thickness of more than 10 µm, frequently more than 50 µm. When arranged in front of a detection surface of an X-ray detector, such metal foil would substantially absorb incident X-rays thereby preventing them to reach the underlying scintillator layer 5. Accordingly, it is proposed to use a non-metal substrate 45 such as e.g. a plastic foil having a thickness of 50-150 µm to serve as a substrate and to mechanically stabilize the OLED foil 8'. On top of the non-metal substrate 45, a barrier layer 47 with a few micrometers thickness and a metal layer 43 having a thickness of e.g. 100 nm to a few micrometers and being made e.g. with aluminium may be deposited. Alternatively, a thin glass substrate having a thickness of 0.1-3 mm may serve for mechanically stabilization and may be coated with a metal layer in the micrometer thickness range.

Portions of a surface of the metal layer 43 may be coated with an insulator layer 41 and a conductor layer 39 on top thereof. Both layers 41, 39 may have a thickness of approximately 100 nm.

In regions laterally adjacent to the insulator layer 41, a PEDOT-layer 37 (poly(3,4-ethylenedioxythiophene), often mixed with PSS=poly(styrenesulphonic acid)) comprising e.g. an organic transparent conductor such as ITO (indium tin oxide) may be deposited on top of the metal layer 43. The PEDOT-layer 37 may have a thickness of 30-60 nm.

A light emitting polymer (LEP) layer 35 or an oligomer multilayer stack may be deposited on top of the PEDOT-layer 37. The LEP layer 35 may have a thickness of approximately 80 nm. The conductor layers 39 and the metal layer 43 may serve as electrodes to the LEP layer 35.

On top of the LEP layer 35, a transparent cathode 33 is deposited in electrical contact with the conductor layer 39. The transparent cathode 33 may comprise a layer stack including a 5 nm thick barium layer, a 15 nm thick silver layer and a 30 nm thick zinc sulphide layer (5 nm Ba/15 nm Ag/30 nm ZnS).

A thin high performance film encapsulation 31 encloses the underlying layers 33, 35, 39, 41, 37. The encapsulation layer 31 may be made e.g. with $(SiN_x/SiO_x)_{5-8}/SiN_x$ and may have a total thickness of a few micrometers, e.g. less than 20 μm.

Optionally, an additional protective coating may be applied (not shown in FIG. 5) with a thickness of e.g. 3-30 μm. Although the encapsulation may be robust against controlled bending down to a radius of about 20 mm without deterioration, it may be sensitive to mechanical handling and may need some protection before and during lamination of the foil 8' on the scintillator layer 5. This function may also be (partly) provided by the lamination glue.

It is to be noted that FIG. 5 does not show any shunt lines or bus bars for the cathode or the anode for clarity reasons.

As an alternative to the top-emission OLED foil 8' shown in FIG. 5, a bottom-emission OLED foil 8" as shown in FIG. 6 may be used. Therein, the layer structure may be more standard in layout as far as the electrodes and encapsulation are concerned as the structure may be basically the same as what can be made on glass substrates. A crucial difference of this OLED structure compared to conventional OLED structures may be a very thin support layer at the bottom side of the foil 8 which may be attached to the scintillator layer 5 and through which the light is emitted as indicated by the arrow V.

The layer stack of the OLED layer 8" shown in FIG. 6 may comprise from top to bottom:
- a PEN (PolyEthylene Naphtalate) or PET (PolyEthylene Terephtalate) cover foil or coating (not shown in the drawing) having a thickness of e.g. 25-100 μm.
- A TFE (Thin Film Encapsulation) layer 51 comprising $(SiN_x/SiO_x)_{5-8}/SiN_x$ and having a total thickness of a few micrometers.
- An aluminium cathode 53 having a thickness of approximately 100 nm.
- An LEP layer or small molecule stack 55 having a thickness of approximately 80 nm.
- An ITO layer and/or a PEDOT-layer 57 having a thickness of approximately 80-100 nm.
- Shunt lines and/or bus bars having a thickness of approximately 100 nm (not shown in the figure).
- A barrier layer 59 comprising $(SiN_x/SiO_{5-8}/SiN_x$ having a total thickness of a few micrometers.
- A polyimide film 61 being preferably transparent and having a thickness of approximately 10 μm.
- Temporarily, during fabrication of the layer stack, a glass carrier substrate may be provided which may be subsequently, after finishing the layer stack, be removed in order to reduce the total thickness of the layer stack.

In order to prepare the foil stack described above, a standard carrier substrate such as a glass substrate may be used which is again removed after manufacturing of the foil 8" for example by UV laser release. On top of this substrate, a thin layer of polyimide may be deposited which may act both as release layer as well as support layer for the OLED foil. Since the polyimide may not be hermetically sealed against moisture, a thin barrier layer may be needed, similar to the encapsulation layer 31 in the example shown in FIG. 5. The rest of the fabrication process may be standard. After encapsulation, an additional protection cover foil or coating 51 may be applied wherein no thickness requirement applies to this encapsulation layer.

For fabricating an X-ray detector according to embodiments of the present invention, the top-emission foil 8' as shown in FIG. 5 or a bottom-emission foil 8" as shown in FIG. 6 may be laminated to a top surface of the scintillator layer 5.

As an alternative manufacturing method, a complete OLED stack may be deposited directly on top of the scintillator layer 5 (or its barrier coating). This method may use the fact that the complete OLED processing may be done at temperatures below e.g. 150° C. which may be significantly less than the process temperature of the scintillator layer 5 and of e.g. a CMOS array used as light detection arrangement 3. This may lead to several advantages. For example, the fabrication process can be kept simple and compatible. No separate foil handling and lamination may be needed. An interlayer distance between the reflector 9 integrated into the OLED and the scintillator layer 5 may be reduced for improving the MTF performance. The deposition of the OLED stack may be done either before or after an attachment of the scintillator layer 5 to the light detection arrangement 3.

The OLED layer stack may comprise from top to bottom:
- A barrier and cover foil. It may be attractive to encapsulate the total OLED stack including the scintillator for additional protection and/or relaxed barrier specification on the scintillator.
- An OLED layer comprising contacts and, optionally, shunt lines.
- A barrier layer.
- Optionally, a scintillator barrier coating.

All these layers may be directly deposited onto a scintillator layer which itself may be attached to a CMOS light detection arrangement.

As in such approach the OLED stack is directly deposited onto the scintillator layer, no glue or adhesive may be provided between the scintillator layer or its coating and the OLED stack. Accordingly, the overall thickness of the OLED stack may be reduced by the thickness of such adhesive layer typically having 10-25 μm. Thus, the distance between the upper surface of the scintillator layer 5 and a reflector layer 9 on top of the OLED may be significantly reduced. Same is true as the OLED does not necessarily have any substrate made e.g. from glass, plastic or metal foil and, furthermore, does not necessarily have a support layer made e.g. from polyimide.

As a further alternative manufacturing method, the scintillator layer 5 may be grown directly onto a surface of the light emission layer 7 such as e.g. an OLED stack. This approach may depend on an allowed temperature stability of the OLED, which should be approximately two hours for 200° C. Advantages may be similar to the advantages obtained with the above manufacturing approach using OLED deposition on the scintillator layer. Again, no glue or adhesive may be necessary between the scintillator layer (or its coating) and the OLED layer.

As a result of such growing of the scintillator layer onto an OLED stack, the scintillator structure may be different compared to conventional manufacturing approaches. Typically, growing of a scintillator layer starts from a thin, solid layer and continues to grow in the form of closely packed vertical pillars. Accordingly, with this manufacturing approach, the starting base layer is facing the OLED instead of the pillar ends as is typically the case in conventional X-ray detectors.

It should be noted that the term "comprising" does not exclude other elements or steps and the term "a" or "an" does not exclude a plurality of elements. It should also be noted that reference signs in the claims should not be construed as limiting the scope of the claims.

LIST OF REFERENCE SIGNS

1 X-ray detector
3 light detection arrangement
5 scintillator layer
7 reflector layer
8 OLED foil
9 light emission layer
11 support substrate layer
12 detection surface
13 photosensitive element
14 encapsulation layer
15 sub-tile
17 negative electrode
19 positive electrode
21 light emitting area
23 shunt line
31 encapsulation layer
33 transparent cathode
35 LEP layer
37 PEDOT layer
39 conductor layer
41 insulator layer
43 metal layer
45 non-metal substrate
47 barrier layer
51 barrier layer
53 cathode
55 LEP layer
57 PEDOT layer
59 barrier layer
61 polyimide film

The invention claimed is:

1. An X-ray detector, comprising:
a light detection arrangement for detecting light incident on a detection surface thereof;
a scintillator layer for converting incident X-rays (X) into light;
a reflector layer for reflecting light generated within the scintillator layer towards the light detection arrangement; and
an OLED light emission layer interposed between the scintillator layer and the reflector layer; and,
a thin film encapsulation layer interposed between the scintillator layer and the reflector layer and configured to prevent side leakage wherein a distance between the scintillator layer and the reflector layer is less than 50 μM,
wherein the reflector layer is either integrated into the OLED or exists in addition to the OLED.

2. The X-ray detector of claim 1, wherein the light emission layer is divided into sub-tiles.

3. The X-ray detector of claim 2, further comprising electrodes for pulsed operation of the light emission layer and configured for activating the light emission layer only during time intervals when no X-rays are incident onto the X-ray detector.

4. The X-ray detector of claim 1, wherein the light emission layer comprises metal shunt lines.

5. The X-ray detector of claim 1, wherein the OLED has an integrated reflection layer and is provided with a top-emission OLED foil.

6. The X-ray detector of claim 5, wherein the top-emission OLED foil is attached with its top-side surface to the scintillator.

7. The X-ray detector of claim 5, wherein the top-emission OLED foil comprises a mechanically stabilizing non-metal substrate and a metal layer coated onto the substrate.

8. The X-ray detector of claim 1, wherein the OLED has an integrated reflection layer and is provided with a bottom-emission OLED foil.

9. The X-ray detector of claim 8, wherein the bottom-emission OLED foil is attached with its bottom-side surface to the scintillator and comprises a support layer at its bottom-side, the support layer having a thickness of less than 50 μm.

10. The X-ray detector of claim 9, said thickness being less than 20 μm.

11. The X-ray detector of claim 1, wherein said distance between the scintillator layer and the reflector layer is less than 20 μm.

12. The X-ray detector of claim 1, wherein said light emission layer has a surface onto which said scintillator layer is grown directly.

13. The X-ray detector of claim 12, wherein said light emission layer is an organic light emitting diode (OLED) stack, and wherein the reflector layer is either integrated into the OLED stack or exists in addition to the OLED stack.

14. The X-ray detector of claim 13, wherein said scintillator layer includes a starting layer that faces said light emission layer.

15. A method of fabricating an X-ray detector, the method comprising:
providing a light detection arrangement for detecting light incident on a detection surface thereof;
optically coupling a scintillator configured to convert incident X-rays into light to the light detection arrangement;
depositing an OLED stack on the scintillator;
depositing a reflector on the OLED stack, the reflector being disposed less than 50 μm from the scintillator with the OLED stack between the scintillator and the reflector.

16. The method of claim 15, further including:
disposing a thin film encapsulation layer on the OLED stack configured to prevent side leakage.

17. A method of fabricating an X-ray detector, the method comprising:
providing a reflector layer;
providing an OLED light emission layer on the reflector layer;
growing a scintillator layer directly onto a surface of the OLED light emission layer;
optically coupling a light detection arrangement to the scintillator.

18. The method of claim 17, further including:
disposing a thin film encapsulation layer on the OLED stack configured to prevent side leakage.

19. An X-ray detector comprising:
a light detection arrangement for detecting light incident on a detection surface thereof;
a scintillator layer for converting incident X-rays into light;
a reflector layer for reflecting light generated within the scintillator layer towards the light detection arrangement; and
a light emission layer interposed between the scintillator layer and the reflector layer,
wherein the light emission layer comprises an organic light emitting diode (OLED), and
wherein the reflector layer is either integrated into the OLED or exists in addition to the OLED;
wherein the light emission layer is an OLED stack that is deposited directly onto said scintillator layer.

20. The X-ray detector of claim 19, wherein the OLED, with the integrated reflector layer, is provided with a top-emission OLED foil, and
wherein the top-emission OLED foil is attached with its top-side surface to the scintillator.

21. The X-ray detector of claim 20, wherein the top-emission OLED foil comprises a mechanically stabilizing non-metal substrate and a metal layer coated onto the substrate.

22. The X-ray detector of claim 19, wherein the OLED, with the integrated reflector layer, is provided with a bottom-emission OLED foil.

23. The X-ray detector of claim 19, wherein a distance between the reflector layer and the scintillator layer is less than 20 μm.

24. The X-ray detector of claim 19, wherein the light emission layer comprises an organic light emitting diode (OLED), and wherein the reflector layer is either integrated into the OLED or exists in addition to the OLED.

25. The x-ray detector of claim 19, further including:
a thin film encapsulation layer between the reflector layer and the scintillator layer and configured to prevent side leakage from the light emission layer.

26. An X-ray detector comprising:
a light detection arrangement for detecting light incident on a detection surface thereof;
a scintillator layer for converting incident X-rays into light;
a reflector layer for reflecting light generated within the scintillator layer towards the light detection arrangement; and
a light emission layer interposed between the scintillator layer and the reflector layer,
wherein the reflector layer is either integrated into the OLED or exists in addition to the OLED;
wherein the light emission layer comprises an organic light emitting diode (OLED) stack, and said light emission layer has a surface onto which said scintillator is grown directly.

27. The x-ray detector of claim 26, further including:
a thin film encapsulation layer between the reflector layer and the scintillator layer and configured to prevent side leakage from the light emission layer.

* * * * *